Jan. 19, 1960     A. W. WENTZ     2,921,783
ELECTRICAL WINDOW OPERATOR UNIT
Filed Sept. 25, 1957     2 Sheets-Sheet 1
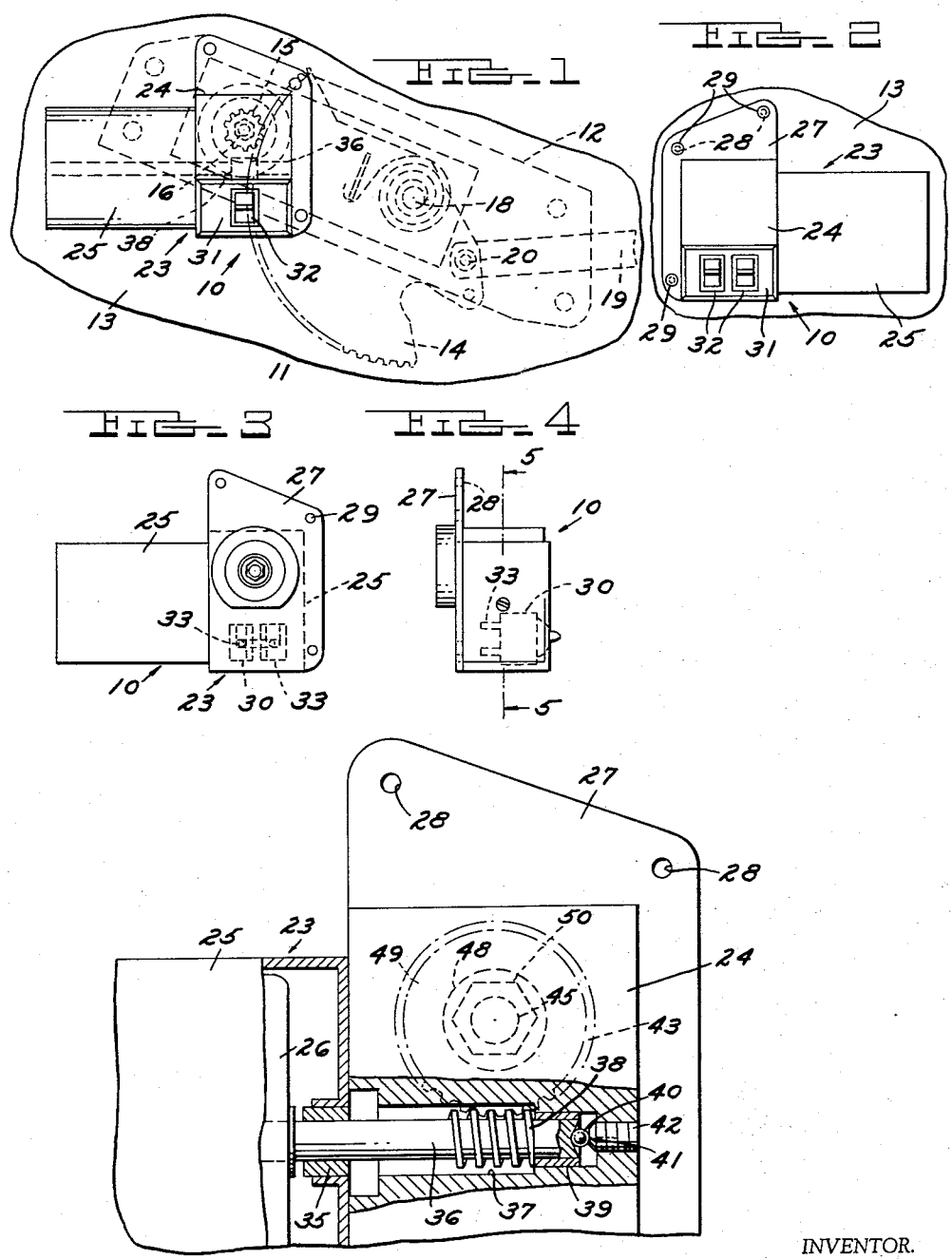
INVENTOR.
ALAN W. WENTZ
BY Whittemore, Hulbert &
Belknap
ATTORNEYS

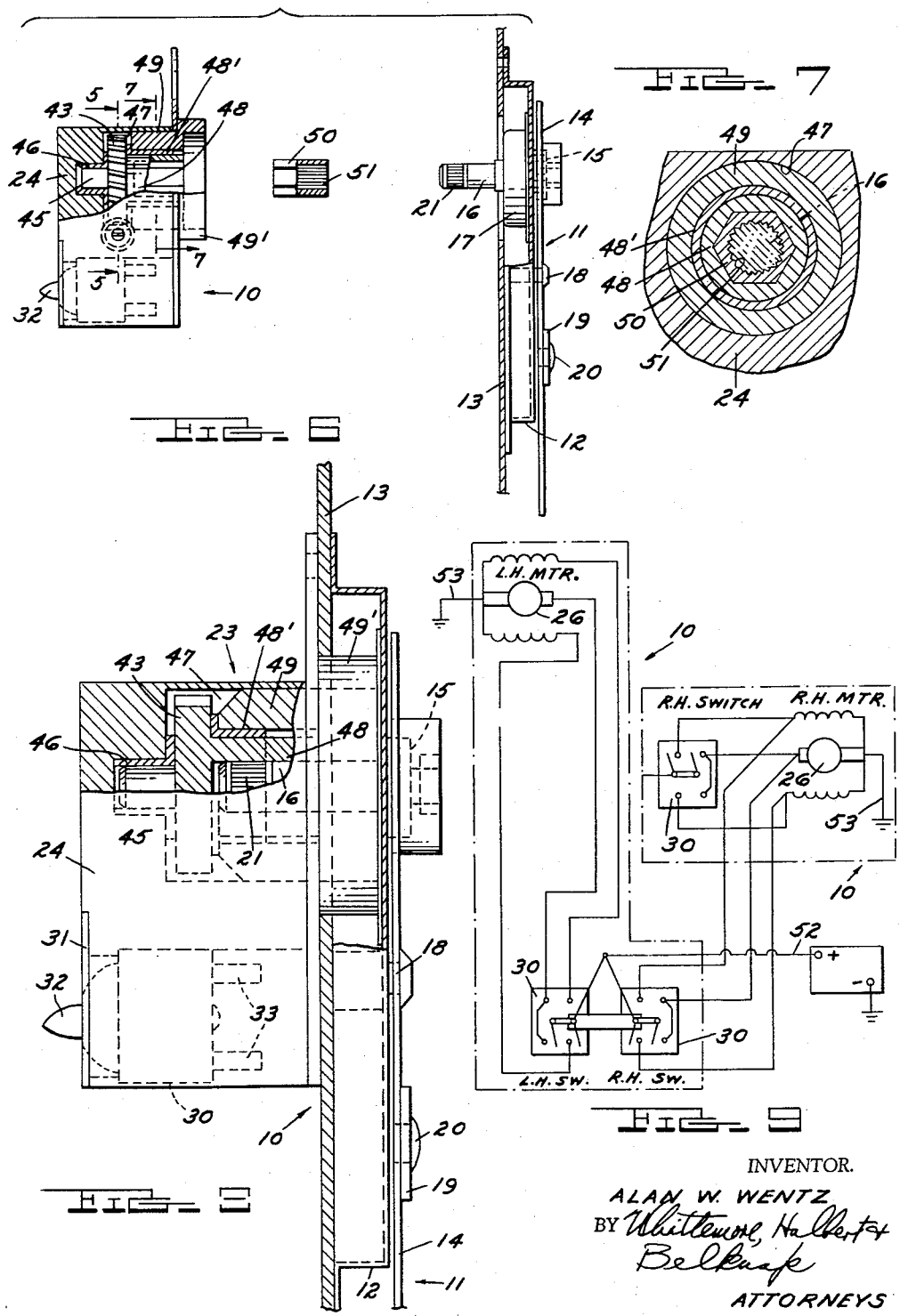

United States Patent Office 2,921,783
Patented Jan. 19, 1960

2,921,783

ELECTRICAL WINDOW OPERATOR UNIT

Alan W. Wentz, Birmingham, Mich.

Application September 25, 1957, Serial No. 686,082

3 Claims. (Cl. 268—124)

The present invention relates to an improved electrical operator unit for automobile or like sliding windows of the type featuring as a part of its window operating or regulator structure a rotary, handle operated spindle actuating a gear segment or similar member operatively connected to the window to control its regulation. The improved unit is simple, compact and inexpensive, being particularly devised for application as a replacement or conversion unit to an existing window regulator structure of the type described, in substitution for the existing manually operated handle applied to the spindle. However, as will appear from the description to follow, the unit is just as well suited for use as a component of an original window regulator installation, and its characteristic compactness and low cost of production are also important factors of advantage in such an installation.

It is a general object of the invention to provide an electrically operated unit for the control of a window or like sliding panel which is very efficient in operation, whether in the form of a replacement or conversion unit or as an item of original installation, this unit being associated with a mechanical regulator device or linkage which is in all respects identical to the mechanism or linkage employed in everyday usage in automobiles, and which unit is readily and easily connected electrically in an existing automotive electrical system.

More specifically, it is an object to provide an electrical operating unit of the sort described which incorporates, in a neat, compact and attractive housing structure, suitable mechanical advantage-multiplying components which are adapted to be mechanically connected with the rotary operating spindle of a conventional type of window operator, together with an electrical motor and means to connect the same readily in the electrical system of an automobile. Whether a conversion or original installation, the mechanical driving provisions include a part or parts which can be easily applied to the rotary driving spindle referred to, preferably featuring an adapter member which may be inexpensively changed in its design to fit spindles of different sorts or designs.

A still further object is to provide an electrical window operator or regulator unit as described which may be optionally produced with single or dual electrical control means, i.e., one or more finger operated switches, so as to enable the invention to be applied to either the left or operator's side of the vehicle or the right or passenger's side, the mechanical, motor-driven components of the unit being identical in either adaptation.

More specifically, it is an object of the invention to provide a unit as described which is composed of a small, sturdy electric motor rated for drive from an existing automotive battery energized electrical system, this motor direct-driving a coaxial mechanical worm, with suitable radial and end-thrust bearing provisions for the shaft. The worm is in mesh with a worm wheel or gear, and the shaft provisions fixedly connected to and rotatable by this gear include a hollow tubular shaft or tubular adapter sleeve, depending upon whether it is contemplated that the unit be a component of an original installation, or an adapter or replacement unit for the conversion of an existing handle-operated regulator. This tubular member has coaxial driving engagement in non-rotative relation to the existing spindle of the mechanical regulator in question. Suitable manual switches, single or dual, are provided, being appropriately wired to the motor, which is in turn wired in the electrical system, and all of these parts are encased in very compact and attractive housing provisions applicable directly to the inner door trim panel of the installation.

The foregoing as well as other objects become more apparent as this description proceeds, especially when considered in connection with the accompanying drawings illustrating a preferred embodiment of the invention, wherein:

Fig. 1 is a front or inner side elevational view of the unit of the invention as applied to a conventional type of automotive window operator or regulator, the trim panel on which the unit is carried having been omitted for clarity, this view depicting a single control operator unit for application to the right or passenger's side of an automobile space;

Fig. 2 is a front or inner side elevation of a corresponding electrical uint in a dual switch adaptation, for application to the left-hand or driver's side of the space, yet otherwise incorporating internal mechanical and electrical provisions identical to those of the form of Fig. 1;

Fig. 3 is a rear or outer side elevation of the unit of Fig. 2;

Fig. 4 is an end elevation of the unit from the switch housing end thereof, i.e., as viewed from the left of Fig. 2;

Fig. 5 is a view in vertical section through the gear and shafting structure of the unit, on a line corresponding to line 5—5 of Figs. 4 and 6, but with switching provisions omitted;

Fig. 6 is an exploded view in end elevation, partially broken away, showing basic componnets of the improved unit as employed for replacement or conversion of an existing regulator installation;

Fig. 7 is a view in vertical section along the line 7—7 of Fig. 6;

Fig. 8 is a view in end elevation, partially broken away and in vertical section, illustrating an alternative application of the improved unit as a component of original window operator or regulator structure; and Fig. 9 is a schematic electrical wiring diagram for either installation.

Referring first to Figs. 1 and 6 of the drawings, the reference numeral 10 generally designates the improved eelctrical operator unit of my invention as applied either for the conversion of an existing conventional window regulator mechanism 11 for automatic, motor-driven operation, or, in the alternative, as a component originally associated with such a mechanism in an automobile door. As shown in Fig. 6, the mechanism ordinarily includes a rigid shaped mounting plate or bracket housing 12 in the form of a sheet metal stamping fixedly applied appropriately to the inner door panel of a door (not shown). In a well-known type of mechanism 11 there is included a tooth gear segment 14 meshing with a pinion 15 fixed on a shaft or spindle 16 which extends inwardly through a small circular spindle casing 17, in which the spindle is appropriately mounted for rotation by suitable means (not shown). Included in the casing 17 (and also not shown) are suitable conventional clutch provisions with which the invention is not concerned.

The segment 14 is appropriately journaled at 18 for oscillation on the mounting plate 12, and has a link 19 pivoted thereon at 20. This link is conventionally connected with any suitable type of window regulator linkage, for example, of the scissors type, through which the window (not shown) is raised and lowered upon oscillation of the segment 14, usually through the agency of an internal handle (not shown) drivingly connected with the inner end of pinion spindle 16, as at a knurled or otherwise non-circular end 21 of that spindle constituting a drive formation.

All of the above described mechanism, other than the unit 10, is entirely conventional in nature, and forms no part of the invention save in the manner in which the spindle 16 is employed in association with the unit 10 in transmitting reversible action to the segment 14 and link 19.

The electrical unit 10 has its electrical and mechanical components mounted in an attractively finished and compact housing structure 23, including a housing member 24, containing electrical switch and mechanical gearing provisions (to be described), and a further housing member 25 within which an electrical motor 26 (Fig. 5) is appropriately mounted by provisions not germane to the invention. I find a 12 volt motor rated at, say, 85 inch-ounce torque shaft output, to be suitable for the purpose as well as for energization by the commonly employed 12 volt automotive electrical circuit.

The switch and gearing housing 24 is provided with a laterally extending flange 27 extending from its end and upper portion, this flange being provided with suitably spaced apertures 28 for the reception of bolts or like securing means 29 by which the unit 10 is attached to the trim panel 13 of the door, as indicated in Figs. 1 and 6, on the opposite side of that panel from the window regulator linkage 11. The regulator, or regulator linkage, is disposed in a space outwardly separated from the occupant's compartment by the inner door panel (not shown) and trim panel 13; and spindle 16 clutch-drives the regulator in this space. The knurled drive formation 21 at the inner end of spindle 16 projects through the panels in question toward and into the occupant's compartment, and the unit 10 of the invention is drivingly applied directly to this end.

As indicated above, the invention may be incorporated in a single switch unit, such as is illustrated in Fig. 1 of the drawings, or in a dual switch unit, such as is shown in Figs. 2, 3 and 4; and the provisions of the unit 10 to be described are the same in either instance, the switches and associated wiring being duplicated in the dual type installation.

As illustrated in Figs. 2, 3 and 4, the gearing and switch housing 24 is adapted to receive a conventional manually controlled, switch unit or units 30, with a closure plate 31 applied to cover these units on the front side of the housing, with the exception of the projecting finger piece 32 of the switch. Wiring terminals for these switches are designated 33, and the individual switch structures are, it is to be understood, conventional and well-known types readily available on the market. Their wiring to occasion reversing energization of the motor 26, in accordance with whether the finger piece is flicked upwardly or downwardly, is indicated in Fig. 9 of the drawings.

The housing members 24, 25 are appropriately secured together in end to end relation, so that the housing structure 23 as a whole is mounted by the attachment of the housing member 24 to the trim panel 13. Motor housing 25 is provided (Fig. 5) with internal bearing provisions 35 at its opposite ends, in which the shaft 36 of the motor 26 is journaled. The shaft 36 extends into a recess 37 in the gearing and switch housing 24, where it is provided with a worm 38; and the outer end of the shaft 36 is journaled in a bearing 39 within the housing 24 at one end of its recess 37. Here the shaft 36 is provided with an anti-friction end thrust bearing or an anti-friction ball 40 riding in the conically recessed end 41 of the shaft and adjustably sustained by a set screw 42 threaded into the adjacent end wall of the housing 24.

The worm 38 meshes with a worm gear or wheel 43 which, as illustrated in Fig. 6, is secured to a stub shaft 45 journaled at one end in a suitable bearing 46 of the housing member 24. The worm gear rotates in a rearwardly opening recess 47 in the housing, within which recess it is provided with a fixedly secured driving extension 48, illustrated as in the form of a tubular sleeve of cylindrical outer outline and non-circular inner outline, for example, the outline of an equilateral hexagonal. Sleeve extension 48 is intended to slidably receive an adapter of like non-circular section (to be described) to drive such adapter. The driving sleeve 48 is piloted by a bearing 48' in a flanged mounting sleeve 49 fitted in the recess 47, the flange 49' of the sleeve 49 abutting the outer side of housing 24 and being outwardly cupped to nest about the casing 17 of the regulator mechanism 11 (Fig. 6) when the unit is applied to the latter. The unit 10 is completed by an adapter sleeve or member 50 whose external cross-sectional outline corresponds with the polygonal internal perimetral outline of the sleeve extension 48, to which the adapter 50 is drivingly coupled for rotation. The sleeve adapter 50 is internally formed in non-circular outline at 51, as by splining or knurling, for a non-rotative, preferably force fitted engagement on the projecting knurled portion 21 of regulator spindle 16.

With the parts thus assembled and drivingly engaged, the housing structure 23 is secured by its flange 27 on the trim panel 13, ready for operation under manual control when the electrical leads 52, 53 of its wiring circuit (Fig. 9) are electrically connected in the wiring circuit of the automobile, as to the positive terminal of the battery and to ground, respectively.

The wiring diagram of Fig. 9 is entirely conventional and self-explanatory, so that the component electrically energized parts and controls are simply designated by the reference numerals above applied thereto, together with further identifying captions. An arrangement for installation at both the driver's side and the passenger's side is shown.

Fig. 8 of the drawings illustrates an adaptation of the electrical unit 10 of the invention as a part of original equipment, in which case the coupling of the shaft 45 of the driven worm wheel 43 may be effected positively and permanently to the existing spindle 16 of the conventional window regulating mechanism 12. Some additional compacting of the overall dimensions of the installation is possible, as indicated in Fig. 8. Obviously, the provisions for mechanically coupling the shaft 45 to spindle 16 should be of a type suited for engagement with the spindle without modification thereof.

The drawings and the foregoing specification constitute a description of the improved electrical window operator unit in such full, clear, concise and exact terms as to enable any person skilled in the art to practice the invention, the scope of which is indicated by the appended claims.

What I claim as my invention is:

1. An electrical unit to operate, from within an automobile or like compartment, a mechanical regulator provided with a rotary spindle having a driving connection with a movable window or like panel member in a space receiving said panel member and outwardly separated from said compartment by a separating panel, which spindle has an inner end projecting inwardly toward said compartment and provided with a non-circular drive formation on an external surface of said end, which formation parallels the spindle axis, said unit comprising an axially extending rotative connector member having a tubular portion which is shaped in cross section to provide an internal, non-circular drive formation parallelling the spindle axis and fixedly sleeved endwise over said inner spindle end, with said respective drive formations in endwise-mated rotative driving engagement with one another to drive said spindle, said connector member having a further drive formation of non-circular cross-section on an exterior portion thereof by which said connector member is driven, driving means connected to said connector member to drive the same, including a hollow element coaxially sleeved endwise onto said further formation of said connector member and provided with an internal drive formation of non-circular cross section in driving engagement with said further formation, and a reversible electric motor operatively connected to said last named means to drive the same, housing means encasing said driving means, and means to mount said housing means on the side of said separating panel toward said compartment.

2. An electrical unit to operate, from within an automobile or like compartment, a mechanical regulator provided with a rotary spindle having a driving connection with a movable window or like panel member in a space receiving said panel member and outwardly separated from said compartment by a separating panel, which spindle has an inner end projecting inwardly toward said compartment and provided with a non-circular drive formation on an external surface of said end, which formation parallels the spindle axis, said unit comprising an axially extending rotative connector member having a tubular portion at one axial end thereof which is shaped in cross section to provide a non-circular internal drive formation paralleling the spindle axis and exposed endwise at said end and fixedly sleeved endwise over said inner spindle end, with said respective drive formations in endwise mated rotative driving engagement with one another to drive said spindle, said connector member having a further drive formation of non-circular cross section on an exterior axial end portion thereof remote from its said first named end by which said connector member is driven, driving gearing connected to said connector member to drive the same, including a hollow element coaxially sleeved endwise onto said further formation of said connector member and provided with an internal drive formation of non-circular cross section in external and releasable driving engagement with said further formation, and a reversible electric motor operatively connected to said gearing to drive the same, housing means encasing said motor and gearing, and means to mount said housing means on the side of said separating panel toward said compartment.

3. An electrical unit in accordance with claim 1, in which the internal drive formation of said tubular portion of said rotative connector member is a splined one paralleling the axes of the connector member and spindle to mate with the external drive formation of the latter, and in which the drive formation on the exterior portion of said connector member and the internal drive formation of said hollow element are of polygonal outline in cross section through said hollow element.

References Cited in the file of this patent
UNITED STATES PATENTS

| | | |
|---|---|---|
| 1,394,907 | Jones | Oct. 25, 1921 |
| 2,718,395 | Ehrlich | Sept. 20, 1955 |